Sept. 25, 1934.  C. L. JOHNSTON  1,974,614
MULTIPLE RECORD SHEET
Filed Oct. 3, 1933
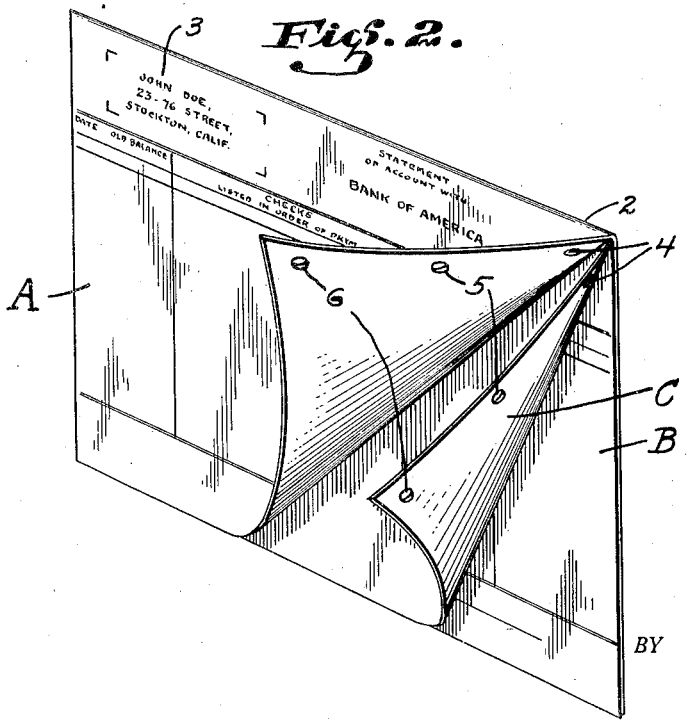
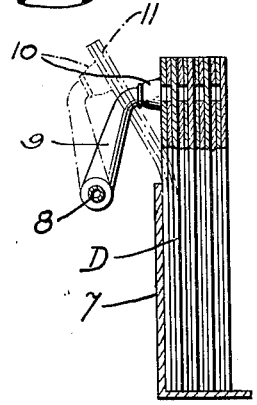
INVENTOR.
Clarence L. Johnston.
BY Townsend & Loftus.
ATTORNEYS.

Patented Sept. 25, 1934

1,974,614

UNITED STATES PATENT OFFICE 1,974,614

MULTIPLE RECORD SHEET

Clarence L. Johnston, Hillsborough, Calif.

Application October 3, 1933, Serial No. 691,954

3 Claims. (Cl. 282—26)

This invention relates to a multiple record sheet and to a method of feeding the same.

A multiple record sheet usually consists of an original record sheet, a duplicate and, sometimes, a triplicate sheet with carbon sheets interleaved between them. The several sheets, including the interleaved carbon sheets, are as a rule joined or tied together along one edge to maintain them in register and to prevent separation of the sheets, but this is not always the case as sets of record sheets and the like are sometimes required which are in no way joined or tied together. Be that as it may, it makes no difference whether the several sheets forming a set are joined or not; the fact nevertheless remains that multiple record sheets can not be readily handled in addressograph machines and the like where an automatic vacuum feeder is employed as such feeders can only pick up and remove from the stack of sheets one sheet at a time.

The object of the present invention is to provide a product in the form a multiple record sheet and the like which may be readily fed by any standard form of automatic vacuum feeder.

The invention briefly stated consists in punching all of the sheets forming a set, with the exception of the bottom or lowermost sheet, along one edge to form one or more registering suction openings in each sheet, through which openings suction may be applied by the suction feeder to the upper and bottom sheet of the set simultaneously, thereby positively gripping the upper and lowermost sheet and, at the same time, clamping the intermediate sheets between the same so that all of the sheets forming a set may be picked up and removed from the stack without disturbing the sets of multiple record sheets remaining in the stack.

The invention is shown, by way of illustration, in the accompanying drawing in which—

Fig. 1 is a plan view of a multiple record sheet;

Fig. 2 is a perspective view of the same, showing the sheets or leaves partially separated;

Fig. 3 is a sectional diagrammatic view showing the manner in which the vacuum feeder operates when picking up and removing multiple sets of sheets.

Referring to the drawing in detail, and particularly Figs. 1 and 2, A indicates an uppermost or original record sheet, B a duplicate record sheet, and C an interleaved carbon or transfer sheet. In this instance only an original and duplicate sheet with a single interleaved carbon are shown, but it should be understood that duplicates, triplicates and even additional sheets may be employed. The several sheets will hereinafter be referred to as a "set". They may be employed as record sheets or for any other purpose desired, and the several sheets may be joined along one edge, as indicated at 2, or they may be entirely separated.

In the present instance, a record sheet in the form of a bank statement is shown. Record sheets of this character are usually joined along the edge indicated at 2, and consist of an original and a duplicate with an interleaved carbon. The three sheets are fed as a unit in the direction of the arrow $a$, see Fig. 1, through an addressograph machine so that the name of the customer, the street address, town, etc., may be applied as indicated at 3. Due to the fact that the record sheet here shown consists of three joined sheets, to wit, the original, the duplicate and the interleaved carbon, and due to the fact that they are joined at the edge indicated at 2 but are fed in the direction of the arrow $a$, it is impossible to employ an automatic vacuum feeder as the vacuum feeder would merely tend to separate the sheets as shown on Fig. 2; hence it has been customary to feed multiple forms of this character through such machines by hand.

In the present instance this difficulty has been overcome by punching the uppermost sheet A and the intermediate sheet C to form registering suction openings, such as indicated at 4, 5 and 6. These suction openings are formed in the sheets A and C only, the bottom or duplicate sheet being left unpunched so that the surface of said sheet will underlie the suction openings. By punching the sheets A and C as illustrated, it is possible to feed multiple record sheets through machines, such as addressographing machines, and the like, regardless of the type of vacuum feeder employed, and the work of applying the name, address, etc., of the client may be rapidly accomplished.

The manner in which multiple record sheets are fed through a machine of this character is illustrated in Fig. 3. The sets of multiple record sheets are placed in stack formation as indicated at D in a holder 7 of suitable construction. Disposed in front of the holder and pivoted as at 8 is one or more arms 9, which are provided at their upper ends with suction cups 10. An oscillating movement is transmitted to the arms 9 about the pivot 8, and the suction cups will thus move to and away from the upper edges of the sheet. When the arms and cups move toward the sheet, vacuum is applied, the cups engage the sheets and register with the suction openings 4, 5 and 6, and as such first of all engage the foremost sheet and as suction is applied through the suction openings, the lowermost sheet will be positively gripped and the intermediate sheets will be clamped between the foremost sheet and the rearmost sheet. When the arms 9 move to the dotted line position shown in Fig. 3, the upper edges of the sheet will be bent forwardly, as indicated at 11, and there be gripped by the feeding rollers, which deliver them to the feed apron. From there the sets are passed into the printing portion of the machine, not here shown.

The invention embodies a product. The product may consist of a plurality of sheets joined along one edge, or otherwise tied together, all of the sheets having registering suction openings formed therein, but the bottom sheet being unperforated and underlying the suction openings. The product also embodies a set of sheets consisting of a plurality of sheets that are not tied together, but all of the sheets except the bottom sheet will have registering suction openings formed therein, and they may be operated upon by a vacuum cup as heretofore described.

Having thus described my invention, what I claim and desire to secure by Letters Patent is—

1. A multiple record sheet comprising a top, a bottom and an intermediate sheet, said top and intermediate sheets having registering holes punched therein forming suction openings, said bottom sheet being unpunched and underlying said suction openings, whereby when the suction cup of a vacuum feeder is applied to the top sheet at the openings formed therein suction will thereby simultaneously be applied through the openings to the surface of the bottom sheet underlying said openings causing said bottom sheet to clamp the top and intermediate sheets against the suction cup so that all of the sheets forming a multiple record sheet will be simultaneously removed by the cup from a stack of multiple record sheets.

2. A multiple record sheet comprising a top, a bottom and an intermediate sheet, said top and intermediate sheets having registering holes punched therein forming suction openings, said bottom sheet being unpunched and underlying said suction openings, whereby when the suction cup of a vacuum feeder is applied to the top sheet at the openings formed therein suction will thereby simultaneously be applied through the openings to the surface of the bottom sheet underlying said openings causing said bottom sheet to clamp the top and intermediate sheets against the suction cup so that all of the sheets forming a multiple record sheet will be simultaneously removed by the cup from a stack of multiple record sheets, and means joining the several sheets along one edge.

3. A product comprising a multiple record sheet consisting of top and bottom sheets and an intermediate carbon sheet, said top and intermediate sheets having registering holes punched therein forming suction openings.

CLARENCE L. JOHNSTON.